US012679400B2

(12) United States Patent
      Hoshiba

(10) Patent No.:    US 12,679,400 B2
(45) Date of Patent:       Jul. 14, 2026

(54) DRIVING ASSISTANCE DEVICE

(71) Applicant: TOYOTA JIDOSHA KABUSHIKI KAISHA, Toyota (JP)

(72) Inventor: Takeshi Hoshiba, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/058,227

(22) Filed: Feb. 20, 2025

(65) Prior Publication Data

US 2025/0326401 A1      Oct. 23, 2025

(30) Foreign Application Priority Data

Apr. 17, 2024    (JP) ................................. 2024-066712

(51) Int. Cl.
      *B60W 30/165*        (2020.01)
      *B60W 30/14*         (2006.01)
                  (Continued)
(52) U.S. Cl.
      CPC .......... *B60W 50/14* (2013.01); *B60W 30/143* (2013.01); *B60W 30/165* (2013.01);
                  (Continued)
(58) Field of Classification Search
      CPC ................. G06V 20/56; G01S 13/931; G01S 2013/9325; B60R 21/00; B60Q 9/008; G01C 21/3407; G01C 21/3492; B60T 2201/04; B60T 7/12; H04L 63/0428; H04L 67/025; H04L 9/14; H04L 9/30; H04L 9/32; H04B 1/3822; H04W 4/027;

H04W 4/029; H04W 4/025; H04W 4/06; H04W 4/40; H04W 4/023; H04W 4/024; H04W 4/38; H04W 4/44; G05D 1/0293; G05D 1/0297; G05D 1/0246; G05D 1/0291; G05D 1/0295; B62D 15/026; B62D 6/00; B62D 15/0255; G08G 1/052; G08G 1/096716; G08G 1/166; G08G 1/0133; G08G 1/0145; G08G 1/096741; G08G 1/096775; G08G 1/167; G08G 1/22; G08G 1/096725; G08G 1/096783; G08G 1/20; G08G 1/00;
                  (Continued)

(56) References Cited

U.S. PATENT DOCUMENTS

2008/0004807 A1 *   1/2008   Kimura ................. B60W 50/16
                                                    701/301
2019/0286917 A1 *   9/2019   Watanabe .............. G06V 20/56
                  (Continued)

FOREIGN PATENT DOCUMENTS

JP        H11-020495 A       1/1999
JP        2019077427 A    *  5/2019

*Primary Examiner* — Dionne Pendleton
(74) *Attorney, Agent, or Firm* — Oliff PLC

(57)                  ABSTRACT

The driving assistance device includes an operation device that is shared for an operation requesting an increase in the upper limit value of the own vehicle speed and an operation requesting the own vehicle to start moving. The processor of the driving assistance device controls the notification device so that information indicating that the upper limit value has increased is provided to the driver when the upper limit value at the time when congestion is resolved is higher than the upper limit value before the congestion occurred.

5 Claims, 4 Drawing Sheets

(51) Int. Cl.
  *B60W 30/18*        (2012.01)
  *B60W 50/14*        (2020.01)
  *B60W 50/00*        (2006.01)

(52) U.S. Cl.
  CPC ................. *B60W 30/18018* (2013.01); *B60W 2050/0083* (2013.01); *B60W 2420/403* (2013.01); *B60W 2420/408* (2024.01); *B60W 2420/54* (2013.01); *B60W 2520/10* (2013.01); *B60W 2554/4046* (2020.02); *B60W 2554/406* (2020.02)

(58) Field of Classification Search
  CPC ............ G08G 1/09623; G08G 1/0967; G08G 1/0112; G08G 1/0129; G08G 1/0141; G08G 1/09; G08G 1/095; G08G 1/0962; G08G 1/09675; G08G 1/096791; G08G 1/0968; G08G 1/16; G08G 1/161; B60K 31/0008; B60K 2031/0016; B60K 2310/20; B60K 2310/264; B60K 2310/268; B60K 31/00; B60K 35/10; B60K 35/21; B60K 2031/0025; B60K 2310/248; B60K 2310/266; B60W 30/16; B60W 30/143; B60W 30/165; B60W 2554/802; B60W 2554/804; B60W 2554/801; B60W 2520/10; B60W 2720/106; B60W 2754/30; B60W 30/18163; B60W 10/18; B60W 2555/60; B60W 50/14; B60W 2420/403; B60W 2554/4041; B60W 2556/50; B60W 2556/65; B60W 2720/10; B60W 30/10; B60W 30/12; B60W 30/17; B60W 30/18154; B60W 40/04; B60W 10/20; B60W 2050/0025; B60W 2050/146; B60W 2420/408; B60W 2520/105; B60W 2540/215; B60W 2552/15; B60W 2554/00; B60W 2554/80; B60W 2710/105; B60W 30/14; B60W 30/146; B60W 30/162; B60W 30/18159; B60W 10/04; B60W 2050/0031; B60W 2554/4023; B60W 2554/4042; B60W 2555/20; B60W 2556/40; B60W 2556/45; B60W 2710/18; B60W 30/00; B60W 40/06; B60W 40/08; B60W 60/0011; B60W 60/00274; B60W 10/06; B60W 10/08; B60W 2040/0818; B60W 2050/0073; B60W 2050/0083; B60W 2050/0292; B60W 2420/54; B60W 2520/04; B60W 2540/10; B60W 2540/12; B60W 2540/20; B60W 2540/21; B60W 2540/221; B60W 2540/30; B60W 2552/00; B60W 2552/05; B60W 2552/10; B60W 2552/53; B60W 2554/4026; B60W 2554/4029; B60W 2554/4048; B60W 2554/4046; B60W 2554/406; B60W 2710/021; B60W 2710/083; B60W 2710/10; B60W 2710/20; B60W 2720/125; B60W 2720/24; B60W 2754/50; B60W 30/02; B60W 30/09; B60W 30/095; B60W 30/0956; B60W 30/18009; B60W 30/18018; B60W 30/18127; B60W 30/18145; B60W 30/182; B60W 40/09; B60W 40/105; B60W 50/0097; B60W 50/029; B60W 60/0013; B60W 60/0015; B60W 60/0018
  See application file for complete search history.

(56)              References Cited

U.S. PATENT DOCUMENTS

2021/0316729 A1*  10/2021  Sugawara ............. B60W 30/17
2023/0202479 A1*  6/2023   Horiguchi ........... B60W 30/165
                                                    701/93

* cited by examiner

DRIVING ASSISTANCE DEVICE

BACKGROUND

The present invention relates to a driving assistance device equipped with a function to assist driving operations that adjust the vehicle speed of an own vehicle.

RELATED ART

A driving assistance device equipped with a function to assist driving operations that adjust the vehicle speed of an own vehicle has been proposed (for example, see Patent Document 1 below). This driving assistance device (hereinafter referred to as the "conventional device") controls the driving device, braking device, etc. (hereinafter referred to as "driving device, etc.") of the own vehicle so that the vehicle speed of the own vehicle matches a predetermined upper limit value (a value preset by the driver) under the condition where the own vehicle is traveling on a highway (constant speed travel function). However, when the vehicle speed of a preceding vehicle (another vehicle traveling immediately in front of the own vehicle) is lower than the upper limit value (set vehicle speed), the conventional device controls the driving device, etc., so that the inter-vehicle distance between the own vehicle and the preceding vehicle becomes greater than a predetermined value (inter-vehicle distance adjustment function). When the conventional device detects that the preceding vehicle has stopped, it causes the own vehicle to stop behind the preceding vehicle. Thereafter, when the conventional device detects that the preceding vehicle has started moving and also detects that a predetermined operation device (switch) has been operated, it controls the driving device, etc., so that the own vehicle starts moving following the preceding vehicle.

[Patent Document 1] JPH11-020495A1

SUMMARY

In this type of driving assistance device, instead of separately providing a switch used for an operation requesting an increase in the upper limit value and a switch used for an operation requesting the start of the own vehicle following a preceding vehicle that has started moving, a single switch for both operations may be provided. In this case, when the driving assistance device detects that the switch has been operated while determining that the own vehicle is in a stopped state, it causes the own vehicle to start moving. On the other hand, when the driving assistance device detects that the switch has been operated while determining that the own vehicle is in a driving state (not determined to be in a stopped state), it increases the upper limit value. Here, the driving assistance device may be configured to determine that the own vehicle is stopped when the time $\Delta t$ during which the vehicle speed of the own vehicle remains at "0 km/h" exceeds a threshold value $\Delta t\_th$.

Meanwhile, for example, a scenario is assumed in which, due to a traffic jam on a highway, a preceding vehicle temporarily stops, and the own vehicle stops behind it. Immediately after that, the preceding vehicle starts moving. In this scenario, at the time when the driver operates the switch to cause the own vehicle to start moving following the preceding vehicle, the time $\Delta t$ may be less than or equal to the threshold value $\Delta t\_th$. Therefore, at the time when the driver operates the switch, the driving assistance device does not determine that the own vehicle is stopped. In other words, the driving assistance device determines that the own vehicle is still in motion. Consequently, the driving assistance device does not cause the own vehicle to start moving in response to the switch operation but instead increases the upper limit value of the own vehicle's speed. The driver may not notice that the upper limit value has increased and may repeatedly operate the switch to start moving the own vehicle. For example, the driving assistance device may increase the upper limit value by a predetermined amount each time the switch is operated within the period where the time $\Delta t$ is less than or equal to the threshold value $\Delta t\_th$. Then, when the driving assistance device detects that the switch has been operated after the time $\Delta t$ exceeds the threshold value $\Delta t\_th$, it causes the own vehicle to start moving. In this way, in a vehicle equipped with the conventional device, during a period when a traffic jam occurs, the driver may unintentionally increase the upper limit value of the own vehicle's speed, leading to a risk that after the traffic jam is resolved, the own vehicle may travel at a higher speed than the driver intended.

One objective of the present invention is to provide a driving assistance device that allows the driver to easily recognize when the upper limit value of the vehicle speed at the time when congestion is resolved has become higher than the upper limit value set before the congestion occurred.

To achieve the above objective, the driving assistance device (1) of the present invention comprises:

An onboard sensor (20) for acquiring information regarding the behavior (sp0) of the own vehicle (V0) and information regarding the behavior (sp1, D) of a preceding vehicle (V1) traveling immediately in front of the own vehicle; and A processor (10) that is capable of executing processing to control the own vehicle such that it travels at a predetermined upper limit value (spmax) of vehicle speed, and processing to control the own vehicle such that it follows the preceding vehicle. The processor is configured to detect when the preceding vehicle has started moving from a stopped state and when a predetermined operation has been executed by the driver of the own vehicle, and to control the own vehicle to start moving following the preceding vehicle.

Additionally, the driving assistance device includes an operation device (25) that is shared for operations requesting an increase in the upper limit value and operations requesting the own vehicle to start moving.

The processor executes a notification process that controls a notification device (50) to provide information indicating that the upper limit value has increased when the upper limit value at the time when congestion is resolved is higher than the upper limit value before the congestion occurred.

According to the driving assistance device of the present invention, even if the driver unintentionally increases the upper limit value of the vehicle speed during congestion, information indicating the increase in the upper limit value is provided to the driver when the congestion is resolved. Therefore, the driver can easily recognize the increase in the upper limit value.

In the driving assistance device according to one aspect of the present invention, The processor stores the upper limit value in a storage device (10c) at the timing when it is determined that congestion has occurred around the own vehicle.

Then, at the timing when it is determined that the congestion has been resolved, if the current value (spmax0) of the upper limit value is higher than the value (spmax1) stored in the storage device, the processor executes the notification process.

Accordingly, the processor can relatively easily detect that the upper limit value of the vehicle speed at the time when congestion is resolved has increased compared to before the congestion occurred.

Additionally, the processor may execute the notification process when the difference ($\Delta$sp) between the current value of the upper limit value at the timing when it is determined that congestion has been resolved and the value stored in the storage device exceeds a threshold ($\Delta$sp_th).

This ensures that information indicating the increase in the upper limit value is provided to the driver only when the upper limit value has increased significantly. In other words, when the change in the upper limit value is minor (i.e., it does not interfere with subsequent driving of the own vehicle), the provision of such information is suppressed.

In the driving assistance device according to another aspect of the present invention, The notification process includes processing to provide the driver with information used to execute a restoration operation that requests the current value of the upper limit value to be returned to the value stored in the storage device.

The processor returns the upper limit value to the value stored in the storage device when it detects that the driver has executed the restoration operation.

Accordingly, the driver can relatively easily restore the upper limit value of the vehicle speed to its original value (the value intentionally set by the driver before congestion occurred).

In the driving assistance device according to another aspect of the present invention, The processor determines that congestion has occurred around the own vehicle when the duration ($\Delta$ta) in which the own vehicle speed remains at or below a predetermined first vehicle speed (spa) exceeds a first congestion determination threshold ($\Delta$tath).

The processor determines that the congestion has been resolved when the duration ($\Delta$tb) in which the own vehicle speed exceeds a second vehicle speed (spb), which is higher than the first vehicle speed, exceeds a second congestion determination threshold ($\Delta$tbth).

Accordingly, the processor can relatively easily detect whether congestion has occurred around the own vehicle.

In the driving assistance device according to another aspect of the present invention, The processor determines that an operation requesting an increase in the upper limit value has been executed when the operation device is operated under the condition that the own vehicle speed is greater than "0" or that the duration ($\Delta$t) in which the own vehicle speed remains at "0" is equal to or less than a stop determination threshold ($\Delta$tth).

The processor determines that an operation requesting the own vehicle to start moving following the preceding vehicle has been executed when the operation device is operated under the condition that the duration in which the own vehicle speed remains at "0" exceeds the stop determination threshold.

Accordingly, in a scenario where the preceding vehicle starts moving immediately after the own vehicle speed becomes "0," the processor does not determine that the own vehicle has stopped. In this case, the own vehicle can start moving following the preceding vehicle without the driver operating the operation device.

DESCRIPTION OF THE EMBODIMENTS

Summary

A driving assistance device 1 according to an embodiment of the present invention is applied, for example, to a vehicle V0 (hereinafter referred to as the "own vehicle") equipped with an autonomous driving function. The driving assistance device 1 includes a notification function that provides predetermined information to the driver when the upper limit value spmax of the own vehicle speed sp0 at the time when congestion is resolved is higher than the upper limit value spmax set before the congestion occurred (the setting value immediately before the determination of congestion occurrence).

(Specific Configuration)

Figure 1:
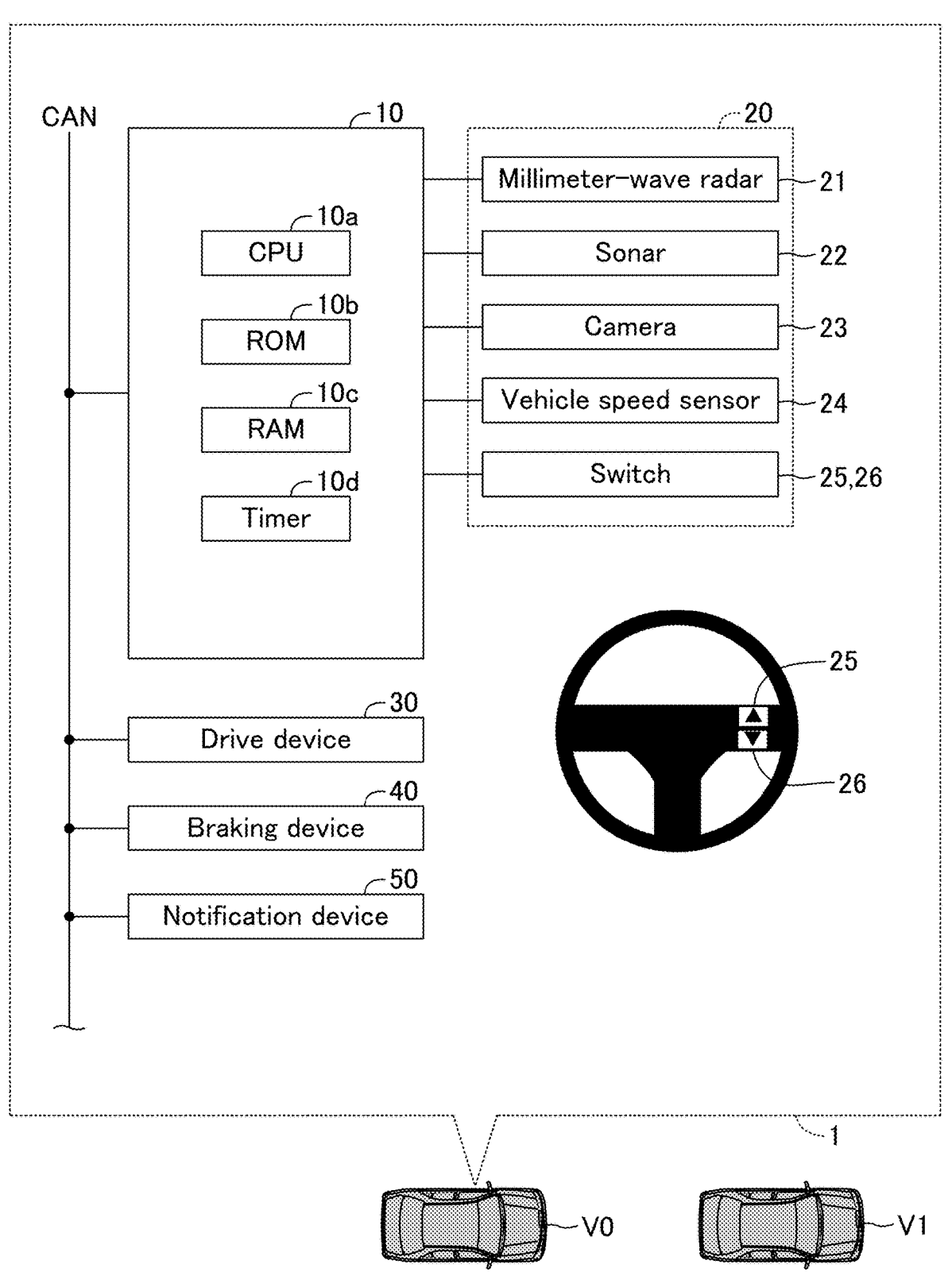
FIG. 1 is a block diagram of a driving assistance device according to an embodiment of the present invention.

As shown in FIG. 1, the driving assistance device 1 includes a driving assistance ECU 10, an onboard sensor 20, a driving device 30, a braking device 40, and a notification device 50.

The driving assistance ECU 10 includes a microcomputer comprising a CPU 10a, ROM 10b, RAM 10c, and a timer 10d (timers 10d_a and 10d_b), among other components. The driving assistance ECU 10 is connected to other ECUs in the own vehicle via a Controller Area Network (CAN).

The onboard sensor 20 includes a front sensor for acquiring information regarding the behavior of the preceding vehicle V1. Specifically, the onboard sensor 20 includes a millimeter-wave radar 21, a sonar 22, and a camera 23 as front sensors.

The millimeter-wave radar 21 comprises a transmission/reception unit and a signal processing unit (not shown). The transmission/reception unit emits millimeter-wave radio waves (hereinafter referred to as "millimeter waves") toward the front of the own vehicle and receives millimeter waves (reflected waves) reflected by objects (the preceding vehicle V1) located within the radiation range. The signal processing unit calculates the distance between the own vehicle and the object, the position (direction) of the object relative to the own vehicle, and the velocity of the object relative to the own vehicle based on the time between the emission and reception of the millimeter waves, the phase difference between the transmitted and received waves, and the attenuation level of the reflected waves. The processing results are transmitted to the driving assistance ECU 10.

The sonar 22 intermittently emits ultrasonic waves into the surrounding area of the own vehicle and receives ultrasonic waves (reflected waves) reflected by objects. The sonar 22 calculates the distance between the own vehicle and an object and the position (direction) of the object relative to the own vehicle based on the time between the transmission and reception of the ultrasonic waves. The processing results are transmitted to the driving assistance ECU 10.

The camera 23 includes an imaging device and an image processing device. The imaging device is a digital camera equipped with an image sensor, such as a charge-coupled device (CCD) or a complementary metal-oxide-semiconductor (CMOS) image sensor. The imaging device is directed forward and positioned at the upper part of the front windshield glass. It captures the foreground of the own vehicle at a predetermined frame rate and obtains image data. The imaging device transmits the image data to the image processing device, which analyzes the acquired image data to obtain information about objects positioned in front of the own vehicle. For example, the image processing device identifies (recognizes) the type of object in front of the own vehicle, such as another vehicle or lane markings, and transmits the identification results to the driving assistance ECU 10.

Furthermore, the onboard sensor 20 includes a vehicle speed sensor 24 for acquiring information regarding the behavior of the own vehicle, specifically its vehicle speed.

The vehicle speed sensor 24 detects the rotational speed of each wheel (wheel speed) and calculates the actual vehicle speed sp0 of the own vehicle based on the wheel speeds. The vehicle speed sensor 24 transmits data representing the vehicle speed sp0 to the driving assistance ECU 10.

Additionally, the onboard sensor 20 includes switches 25 and 26 as operation devices of the own vehicle.

The switches 25 and 26 include push-button switch elements. They are integrated, for example, into the spokes of the steering wheel. The switch 26 is positioned near (e.g., below) the switch 25. The switch 25 is shared for operations in which the driver requests an increase (setting change) in the upper limit value spmax of the vehicle speed sp0 and operations in which the driver requests the own vehicle to start moving to follow the preceding vehicle V1. The switch 26 is used when the driver requests a decrease in the upper limit value spmax. The driving assistance ECU 10 monitors the on/off states of these switches.

The driving device 30 applies driving force to the drive wheels. The driving device 30 includes an engine ECU, an internal combustion engine, a transmission, and a driving force transmission mechanism that transmits driving force to the wheels. The engine ECU acquires information (target value) representing the target driving force from other ECUs (driving assistance ECU 10) and adjusts the driving force applied to the drive wheels by driving the throttle valve of the internal combustion engine based on this information. The driving force generated by the internal combustion engine is transmitted to the drive wheels through the transmission and driving force transmission mechanism.

If the vehicle to which the driving assistance device 1 is applied is a hybrid electric vehicle (HEV), the engine ECU can control the driving force of the vehicle generated by either or both of the "internal combustion engine and electric motor" as the vehicle's driving source. If the vehicle to which the driving assistance device 1 is applied is a battery electric vehicle (BEV), a motor ECU that controls the driving force generated by the "electric motor" as the vehicle's driving source can be used instead of the engine ECU.

The braking device 40 applies braking force to the wheels (brake discs). The braking device 40 includes a brake ECU and brake calipers. The brake calipers include actuators that press brake pads against the brake discs. The brake ECU acquires information (target value) representing the target braking force from other ECUs and adjusts the braking force applied to the wheels (brake discs) by driving the actuators of the brake calipers based on this information.

The notification device 50 includes an acoustic device and an image display device. The acoustic device plays a predetermined sound (chime) in response to a command transmitted from the driving assistance ECU 10. The image display device displays a predetermined image in response to a command transmitted from the driving assistance ECU 10.

(Operation)

When the ACC switch (not shown) installed in the own vehicle is turned on, the driving assistance ECU 10 executes processing to assist driving operations in adjusting the vehicle speed sp0 of the own vehicle as described below. This function is generally referred to as adaptive cruise control (ACC). ACC includes a constant speed travel function and an inter-vehicle distance adjustment function.

(Constant Speed Travel Function)

The driving assistance ECU 10 determines whether a preceding vehicle V1 is present based on information acquired from the front sensor. If no preceding vehicle V1 is present (i.e., the distance between the own vehicle and the preceding vehicle V1 exceeds a threshold), the driving assistance ECU 10 executes constant speed travel processing that controls the driving device, etc., so that the vehicle speed sp0 of the own vehicle matches the upper limit value spmax.

(Inter-Vehicle Distance Adjustment Function)

If the driving assistance ECU 10 determines that a preceding vehicle V1 is present, it acquires the inter-vehicle distance D between the preceding vehicle V1 and the own vehicle, as well as the speed of the preceding vehicle V1 relative to the own vehicle (relative speed), from the front sensor. Additionally, the driving assistance ECU 10 acquires the vehicle speed sp0 of the own vehicle from the vehicle speed sensor 24. The driving assistance ECU 10 calculates the target value Dt of the inter-vehicle distance D based on this information.

When the speed of the preceding vehicle V1 (sp1) relative to the vehicle speed sp0 of the own vehicle (relative speed vr=v0−vs) is greater than "0," the inter-vehicle distance D increases. If the inter-vehicle distance D is larger than the target value Dt, the driving assistance ECU 10 sets the target value of the acceleration α of the own vehicle to a predetermined value α1 (>0) so that the vehicle speed sp0 of the own vehicle becomes greater than the speed sp1 of the preceding vehicle V1. Then, the driving assistance ECU 10 controls the driving device, etc., so that the actual acceleration α of the own vehicle matches the predetermined value α1 (acceleration control). As a result, the inter-vehicle distance D decreases and approaches the target value Dt. When the inter-vehicle distance D matches the target value Dt, the driving assistance ECU 10 sets the target value of the acceleration α of the own vehicle to "0." In other words, the driving assistance ECU 10 controls the driving device, etc., so that the own vehicle travels at the same speed as the preceding vehicle V1.

On the other hand, when the relative speed vr is less than "0," the inter-vehicle distance D decreases. If the inter-vehicle distance D is smaller than the target value Dt, the driving assistance ECU 10 sets the target value of the acceleration α to a predetermined value α2 (<0) so that the vehicle speed sp0 of the own vehicle becomes smaller than the speed sp1 of the preceding vehicle V1. Then, the driving assistance ECU 10 controls the driving device, etc., so that the actual acceleration α of the own vehicle matches the predetermined value α2 (deceleration control). As a result, the inter-vehicle distance D increases and approaches the target value Dt. When the inter-vehicle distance D matches the target value Dt, the driving assistance ECU 10 sets the target value of the acceleration α to "0."

A database storing the relationship between vehicle speeds sp0, sp1, and the target value Dt, or parameters defining an equation for calculating the target value Dt, is stored in ROM 10b. The driving assistance ECU 10 determines the target value Dt based on the database or equation. Additionally, in controlling the adjustment of the inter-vehicle distance D, the driving assistance ECU 10 controls the driving device, etc., so that the vehicle speed sp0 of the own vehicle does not exceed the upper limit value spmax. In other words, if the speed sp1 of the preceding vehicle V1 is higher than the upper limit value spmax, an increase in the inter-vehicle distance D is allowed.

Furthermore, while executing ACC, if the preceding vehicle V1 stops (sp1=0 km/h), the driving assistance ECU 10 stops the own vehicle behind the preceding vehicle V1 (sp0=0 km/h). If the driving assistance ECU 10 determines that the own vehicle is stopped and detects that the preceding vehicle V1 has started moving and that switch 25 has been pressed (transitioned from the off state to the on state), it causes the own vehicle to start moving.

Figure 2:
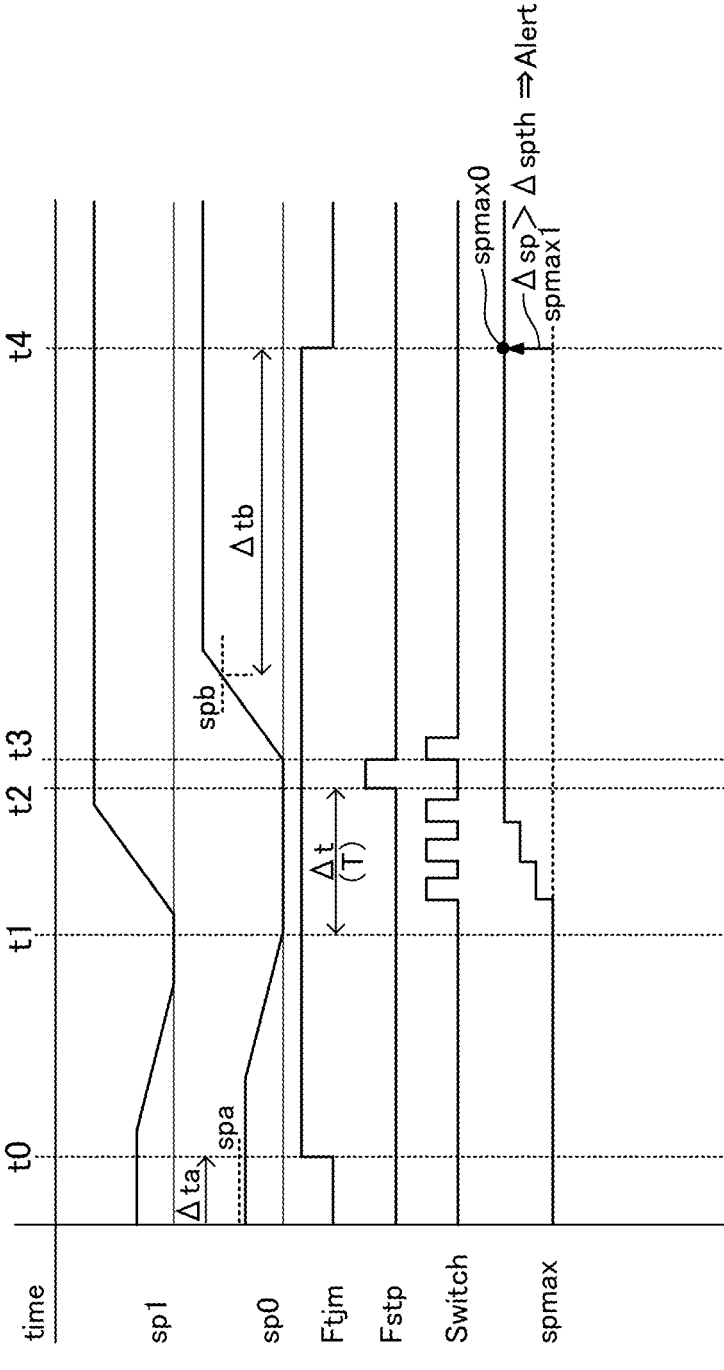
FIG. 2 is a time chart showing changes in the vehicle speed of the own vehicle and the preceding vehicle, as well as changes in various flags.

Here, for example, if congestion occurs around the own vehicle, the own vehicle is likely to repeatedly stop and start. In this scenario, the frequency of operating switch 25 to restart the own vehicle is expected to be high. Therefore, while executing ACC, the driving assistance ECU 10 continuously acquires the vehicle speed sp0 from the vehicle speed sensor 24, and if the duration Δt for which the vehicle speed sp0 remains at "0 km/h" exceeds a threshold value Δtth (time t2 in FIG. 2), it determines that the own vehicle is stopped. At this time, the driving assistance ECU 10 sets a stop flag Fstp (a flag indicating whether the own vehicle is stopped) to "1" (indicating that the own vehicle is stopped). Subsequently, when the vehicle speed sp0 exceeds "0 km/h" (time t3 in FIG. 2), the driving assistance ECU 10 determines that the own vehicle is running (not stopped). At this time, the driving assistance ECU 10 sets the stop flag Fstp to "0" (indicating that the own vehicle is not stopped).

If the driving assistance ECU 10 detects that the preceding vehicle V1 has started moving while the stop flag Fstp is "0" (for example, immediately after the vehicle speed sp0 decreases to "0 km/h" and Δt≤Δtth), it controls the driving device, etc., so that the own vehicle starts moving to follow the preceding vehicle V1, regardless of the on/off state of switch 25. On the other hand, if the driving assistance ECU 10 detects that the preceding vehicle V1 has started moving while the stop flag Fstp is "1" (Δt>Δtth) and also detects that switch 25 has transitioned from the off state to the on state (time t3 in FIG. 2), it controls the driving device, etc., so that the own vehicle starts moving to follow the preceding vehicle V1.

The driving assistance ECU 10 determines whether the preceding vehicle V1 has started moving based on information acquired from the front sensor. For example, if the driving assistance ECU 10 detects that the speed sp1 of the preceding vehicle V1 acquired from the millimeter-wave radar 21 has increased from "0 km/h" and exceeded a threshold, it determines that the preceding vehicle V1 has started moving. Additionally, for example, the driving assistance ECU 10 may also determine that the preceding vehicle V1 has started moving when the inter-vehicle distance between the own vehicle and the preceding vehicle V1 exceeds a threshold.

Additionally, in a situation where the stop flag Fstp is "0," each time switch 25 is pressed, the upper limit value spmax is increased by a predetermined value (e.g., 3 km/h). Similarly, in a situation where the stop flag Fstp is "0," each time switch 26 is pressed, the upper limit value spmax is decreased by a predetermined value (e.g., 3 km/h). Thus, when the own vehicle is not determined to be stopped (Fstp="0"), the driver can change the upper limit value spmax.

As described above, switch 25 is shared for operations in which the driver requests the own vehicle to start moving to follow the preceding vehicle V1 and operations in which the driver requests an increase in the upper limit value spmax. Here, in a scenario where congestion has occurred around the own vehicle, the driver may recognize that the own vehicle has stopped when the vehicle speed sp0 decreases to "0 km/h" (time t1 in FIG. 2) and remains at "0 km/h" for a duration Δt within a period T before exceeding the threshold Δtth (before the driving assistance ECU 10 determines that "the own vehicle has stopped").

If the preceding vehicle V1 starts moving during period T, the driver may press switch 25 intending to start the own vehicle to follow the preceding vehicle V1. However, since the stop flag Fstp is "0" during period T, the driving assistance ECU 10 only increases the upper limit value spmax each time switch 25 is pressed and does not start the own vehicle. The driver may fail to notice this increase in the upper limit value spmax. Subsequently, when the congestion clears and constant speed travel processing begins, there is a risk that the own vehicle will travel at a higher speed than the driver intended.

To address this, the driving assistance ECU 10 includes a notification function that executes a notification process as described below.

(Notification Function)

While executing ACC, the driving assistance ECU 10 determines whether congestion has occurred around the own vehicle based on the vehicle speed sp0. Specifically, if the duration Δta in which the vehicle speed sp0 remains at or below a threshold spa exceeds a threshold Δtath (time t0 in FIG. 2), the driving assistance ECU 10 determines that congestion has occurred around the own vehicle. At this time, the driving assistance ECU 10 sets a congestion flag Ftjm to "1" (indicating congestion).

Subsequently, if the duration Δtb in which the vehicle speed sp0 remains above a predetermined threshold spb (>spa) exceeds a threshold Δtbth (time t4 in FIG. 2), the driving assistance ECU 10 determines that congestion has been resolved (i.e., congestion is no longer present). At this time, the driving assistance ECU 10 sets the congestion flag Ftjm to "0" (indicating no congestion).

At the moment when the congestion flag Ftjm transitions from "0" to "1" (time to), the driving assistance ECU 10 acquires the current upper limit value spmax and stores it as spmax1 in RAM 10c.

At the moment when the congestion flag Ftjm transitions from "1" to "0" (time t4), the driving assistance ECU 10 acquires the current upper limit value spmax (spmax0). If spmax0 is greater than the stored value spmax1 in RAM 10c and the difference Δsp (=spmax0−spmax1) exceeds a threshold Δspth, the driving assistance ECU 10 controls the notification device 50 to provide the driver with specific information to alert them about the increase in the upper limit value spmax.

Specifically, the driving assistance ECU 10 causes the image display device of the notification device 50 to display an image indicating that the upper limit value spmax has increased (i.e., the current upper limit value spmax0 is higher than the upper limit value spmax1 just before congestion occurred). Additionally, the driving assistance ECU 10 causes the acoustic device of the notification device 50 to play a predetermined sound (beep sound).

Figure 3:
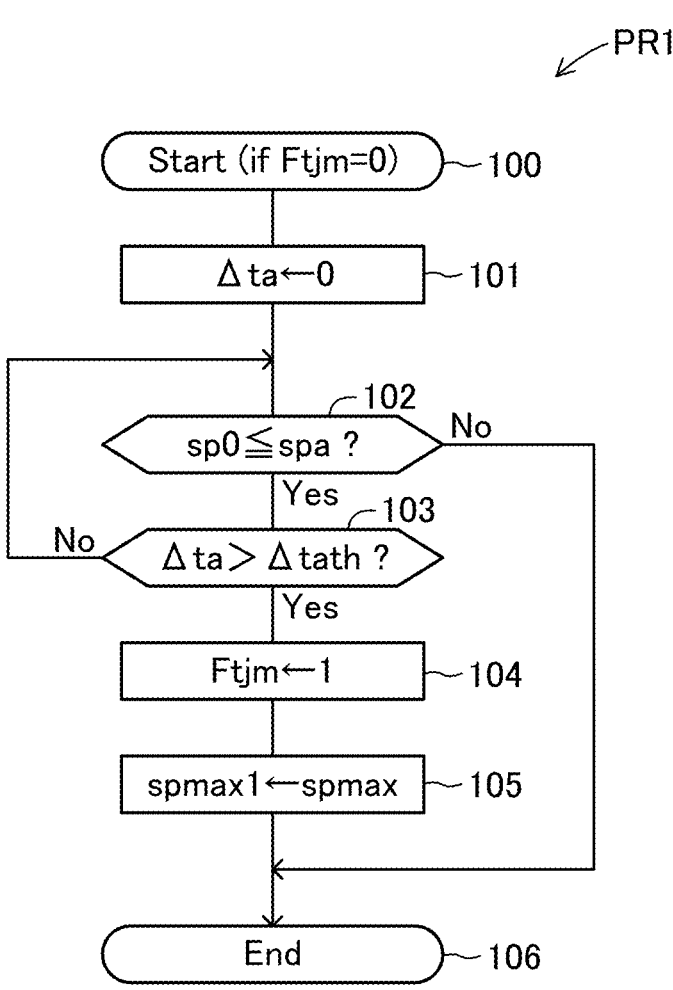
FIG. 3 is a flowchart of a first program executed by the CPU to implement the notification function.
Figure 4:
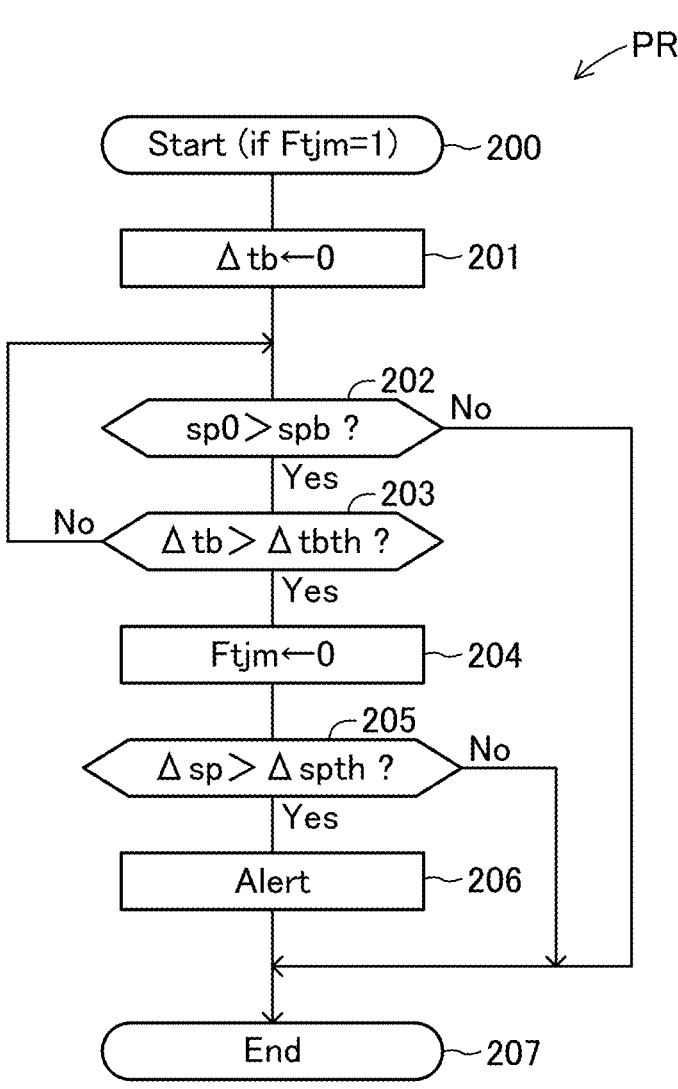
FIG. 4 is a flowchart of a second program executed by the CPU to implement the notification function.

Next, with reference to FIG. 3 and FIG. 4, the programs PR1 and PR2 executed by the CPU 10*a* (hereinafter referred to as "CPU") of the driving assistance ECU 10 to implement the above notification function will be described. In addition to programs PR1 and PR2, the CPU executes multiple other programs (not shown) such as program PR3 and program PR4.

Program PR3 includes a process that sets the stop flag Fstp to "0" or "1" (switching the value of stop flag Fstp as needed) based on changes in the own vehicle speed sp0.

Program PR4 includes:

A process that increases the upper limit value spmax when switch 25 is pressed while the stop flag Fstp is "0."

A process that controls the driving device, etc., to allow the own vehicle to start following the preceding vehicle V1 when switch 25 is pressed while the stop flag Fstp is "1."

(Program PR1)

The CPU executes program PR1 periodically when the congestion flag Ftjm is "0." While executing program PR1 and the subsequent program PR2, the CPU sets the congestion flag Ftjm to "0" or "1" as necessary. The CPU starts executing program PR1 from step 100 and proceeds to step 101.

In step 101, the CPU initializes timer 10*d_a*. Specifically, the CPU resets the output of timer 10*d_a* (which measures the duration Δta in which the own vehicle speed sp0 remains at or below the threshold spa) to "0" and starts measuring the duration Δta with timer 10*d_a*. The CPU then proceeds to step 102.

In step 102, the CPU determines whether the vehicle speed sp0 is at or below the threshold spa.

If the CPU determines that the vehicle speed sp0 is at or below the threshold spa (102: Yes), it proceeds to step 103.

If the CPU determines that the vehicle speed sp0 is above the threshold spa (102: No), it proceeds to step 106 and ends the execution of program PR1.

In step 103, the CPU determines whether the duration Δta has exceeded the threshold Δtath.

If the CPU determines that the duration Δta has exceeded the threshold Δtath (103: Yes), it proceeds to step 104.

If the CPU determines that the duration Δta has not exceeded the threshold Δtath (103: No), it returns to step 102.

In step 104, the CPU sets the congestion flag Ftjm to "1" and then proceeds to step 105.

In step 105, the CPU stores the current upper limit value spmax as spmax1 in RAM 10*c*. The CPU then proceeds to step 106, where it ends the execution of program PR1.

(Program PR2)

The CPU executes program PR2 when the congestion flag Ftjm is "1." The CPU starts executing program PR2 from step 200 and proceeds to step 201.

In step 201, the CPU initializes timer 10*d_b*. Specifically, the CPU resets the output of timer 10*d_b* (which measures the duration Δtb in which the own vehicle speed sp0 remains above the threshold spb) to "0" and starts measuring the duration Δtb with timer 10*d_b*. The CPU then proceeds to step 202.

In step 202, the CPU determines whether the vehicle speed sp0 is above the threshold spb.

If the CPU determines that the vehicle speed sp0 is above the threshold spb (202: Yes), it proceeds to step 203.

If the CPU determines that the vehicle speed sp0 is not above the threshold spb (202: No), it proceeds to step 207 and ends the execution of program PR2.

In step 203, the CPU determines whether the duration Δtb has exceeded the threshold Δtbth.

If the CPU determines that the duration Δtb has exceeded the threshold Δtbth (203: Yes), it proceeds to step 204.

If the CPU determines that the duration Δtb has not exceeded the threshold Δtbth (203: No), it returns to step 202.

In step 204, the CPU sets the congestion flag Ftjm to "0" and then proceeds to step 205.

In step 205, the CPU reads the upper limit value spmax1 from RAM 10*c* and determines whether the difference Δsp (=spmax0−spmax1) between the current upper limit value spmax0 and spmax1 exceeds the threshold Δspth.

If the CPU determines that the difference Δsp exceeds the threshold Δspth (205: Yes), it proceeds to step 206.

If the CPU determines that the difference Δsp does not exceed the threshold Δspth (205: No), it proceeds to step 207 and ends the execution of program PR2.

In step 206, the CPU controls the notification device 50 so that a predetermined warning is provided to the driver. The CPU then proceeds to step 207, where it ends the execution of program PR2.

Effects

According to the driving assistance device 1, even if the driver unintentionally increases the upper limit value spmax of the own vehicle speed sp0 during congestion, information indicating the increase in the upper limit value spmax is provided to the driver when the congestion is resolved. Thus, the driver can easily recognize the increase in the upper limit value spmax.

It should be noted that the present invention is not limited to the above embodiment and that various modifications can be made within the scope of the present invention.

Modification 1

In the above embodiment, if the difference Δsp exceeds the threshold Δspth, the driving assistance ECU 10 displays an image on the image display device of the notification device 50 indicating that "the upper limit value spmax at the time when congestion is resolved is higher than the upper limit value before the congestion occurred."

Additionally, the driving assistance ECU 10 may display an image (message, execution button, etc.) used to execute a restoration operation that requests the upper limit value spmax to be restored to the value before congestion (spmax1). If the driver executes the restoration operation, the driving assistance ECU 10 performs the restoration process.

Modification 2

The driving assistance ECU 10 may be configured so that when the congestion flag Ftjm is "1" and the stop flag Fstp is "0," pressing switch 25 does not increase the upper limit value spmax.

What is claimed is:

1. A driving assistance device comprising:

an in-vehicle sensor configured to acquire information regarding the behavior of an own vehicle and information regarding the behavior of a preceding vehicle traveling immediately ahead of the own vehicle;

a processor configured to execute a process of controlling the own vehicle to travel at a predetermined upper limit speed and a process of controlling the own vehicle to follow the preceding vehicle, and further configured to detect that the preceding vehicle has started moving from a stopped state in which both the own vehicle and the preceding vehicle are stationary, and when it is detected that a driver of the own vehicle has performed a predetermined operation, to execute a process of controlling the own vehicle to start moving in accordance with the preceding vehicle;

an operation device that is shared for an operation requesting an increase in the upper limit speed and an operation requesting the own vehicle to start moving; and a notification device, wherein the processor is configured to execute a notification process that controls the notification device such that information indicating that the upper limit speed has increased is provided to the driver when the upper limit speed at the time when the traffic congestion has been resolved is higher than the upper limit speed before the traffic congestion occurred.

2. The driving assistance device according to claim 1, wherein the processor is configured to store the upper limit speed in a storage device at the timing when it is determined that traffic congestion has occurred around the own vehicle, and subsequently, at the timing when it is determined that the traffic congestion has been resolved, if the current value of the upper limit speed is greater than the value stored in the storage device, to execute the notification process.

3. The driving assistance device according to claim 2, wherein the notification process includes a process of providing the driver with information used to execute a restoration operation that requests returning the current value of the upper limit speed to the value stored in the storage device, and the processor is configured to return the upper limit speed to the value stored in the storage device when it is detected that the driver has executed the restoration operation.

4. The driving assistance device according to claim 1, wherein the processor is configured to determine that traffic congestion has occurred around the own vehicle when the duration of a state in which the own vehicle speed is equal to or lower than a predetermined first speed exceeds a first congestion determination threshold, and to determine that the traffic congestion has been resolved when the duration of a state in which the own vehicle speed exceeds a second speed, which is higher than the first speed, exceeds a second congestion determination threshold.

5. The driving assistance device according to claim 1, wherein the processor is configured to determine that an operation requesting an increase in the upper limit speed has been executed when the operation device is operated under a condition where the own vehicle speed is greater than "0" or the duration of a state in which the own vehicle speed is "0" is equal to or less than a stop determination threshold, and to determine that an operation requesting the own vehicle to start moving in accordance with the preceding vehicle has been executed when the operation device is operated under a condition where the duration of a state in which the own vehicle speed is "0" exceeds the stop determination threshold.

* * * * *